Figure 2:
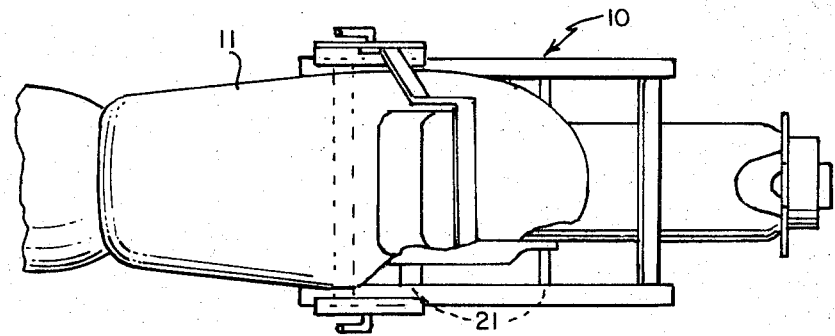

United States Patent [19]
George

[11] 3,822,917
[45] July 9, 1974

[54] ADJUSTABLE BACKREST FOR A SEAT FOR CYCLES

[76] Inventor: Samuel H. George, 44 Schiverea Ave., Freehold, N.J. 07728

[22] Filed: May 22, 1972

[21] Appl. No.: 255,257

[52] U.S. Cl............. 297/195, 297/355, 297/DIG. 9
[51] Int. Cl.............................................. B62j 1/00
[58] Field of Search .......... 297/383, 354, 355, 357, 297/DIG. 9, 195, 243; 248/393, 397

[56] References Cited
UNITED STATES PATENTS

| | | | |
|---|---|---|---|
| 341,748 | 11/1886 | Haynes | 297/383 |
| 842,976 | 2/1907 | Rich | 297/383 |
| 1,799,871 | 4/1931 | Seaman | 248/393 |
| 2,040,942 | 5/1936 | Katenkamp | 297/383 |
| 2,272,124 | 2/1942 | Lingle | 248/393 |
| 2,383,173 | 8/1945 | Watter | 248/393 |
| 2,446,933 | 8/1948 | Jones | 248/393 |
| 2,937,765 | 5/1960 | Shank | 312/341 N R |
| 3,698,762 | 10/1972 | Gorman | 297/DIG. 9 |

Primary Examiner—James T. McCall
Attorney, Agent, or Firm—Howard T. Jeandron

[57] ABSTRACT

An adjustable backrest for a motorcycle seat. Said backrest is slideably adjusted between two parallel tracks and said tracks are affixed to the frame of the motorcycle on either side of the buddy seat. The backrest is movable from a position near the front of the long buddy seat to the extreme rear of the seat. The backrest is supported by two arms that extend downward and are slidably affixed to the two parallel tracks. The ends of the arms are pivotally affixed to permit changing the angle of the backrest with relation to the motorcycle seat and a locking arrangement may be employed so that the backrest may be locked in any desired angular position.

4 Claims, 3 Drawing Figures

ADJUSTABLE BACKREST FOR A SEAT FOR CYCLES

The present invention relates to an adjustable backrest for a long buddy seat for a motorcycle or bike and provides the supporting means attached to the frame of the cycle or bike to slide said backrest forward or backward as well as permitting adjusting the backrest to a desired angle.

Generally a motorcycle backrest is available as a fixed structure from the manufacturer. However, it is difficult for a cyclist to obtain an adjustable backrest that is movable to various positions along the seat to accommodate a single rider or two riders and permit adjustment to a desired angle to meet the personal desire of each rider.

It is an object of this invention to provide an adjustable backrest for a long buddy seat of a motorcycle in which the backrest is movable to a position along the length of the seat to be not only settable at a desired position for a single rider but also settable at a desired position for two riders.

It is a further object of this invention to provide an adjustable backrest for a long buddy seat of a motorcycle in which the backrest is not only movable along the length of the seat to a desired position but is also adjustable to a desired angle according to the personal riding attitude of the rider.

It is a further object of this invention to provide an adjustable backrest for a long buddy seat of a motorcycle in which the backrest is so constructed that it is universally fitted to all makes of motorcycles.

Figure 1:
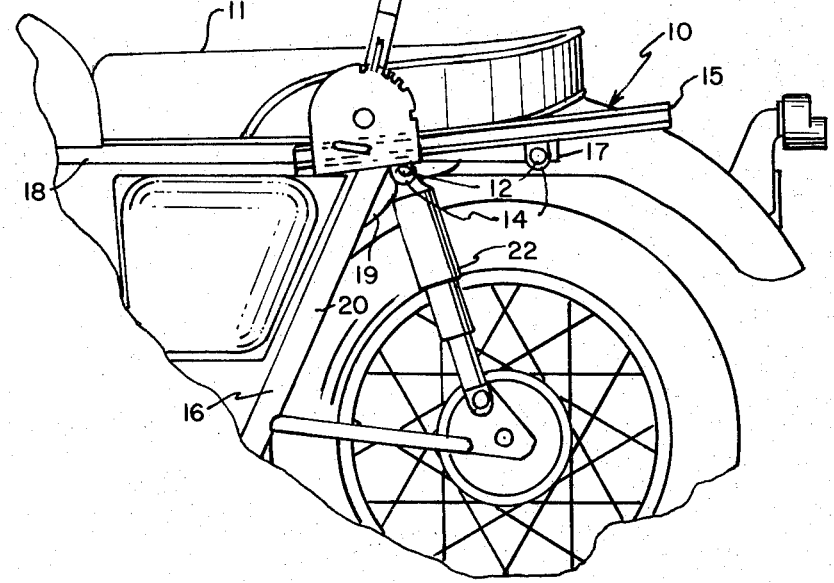
Figure 3:
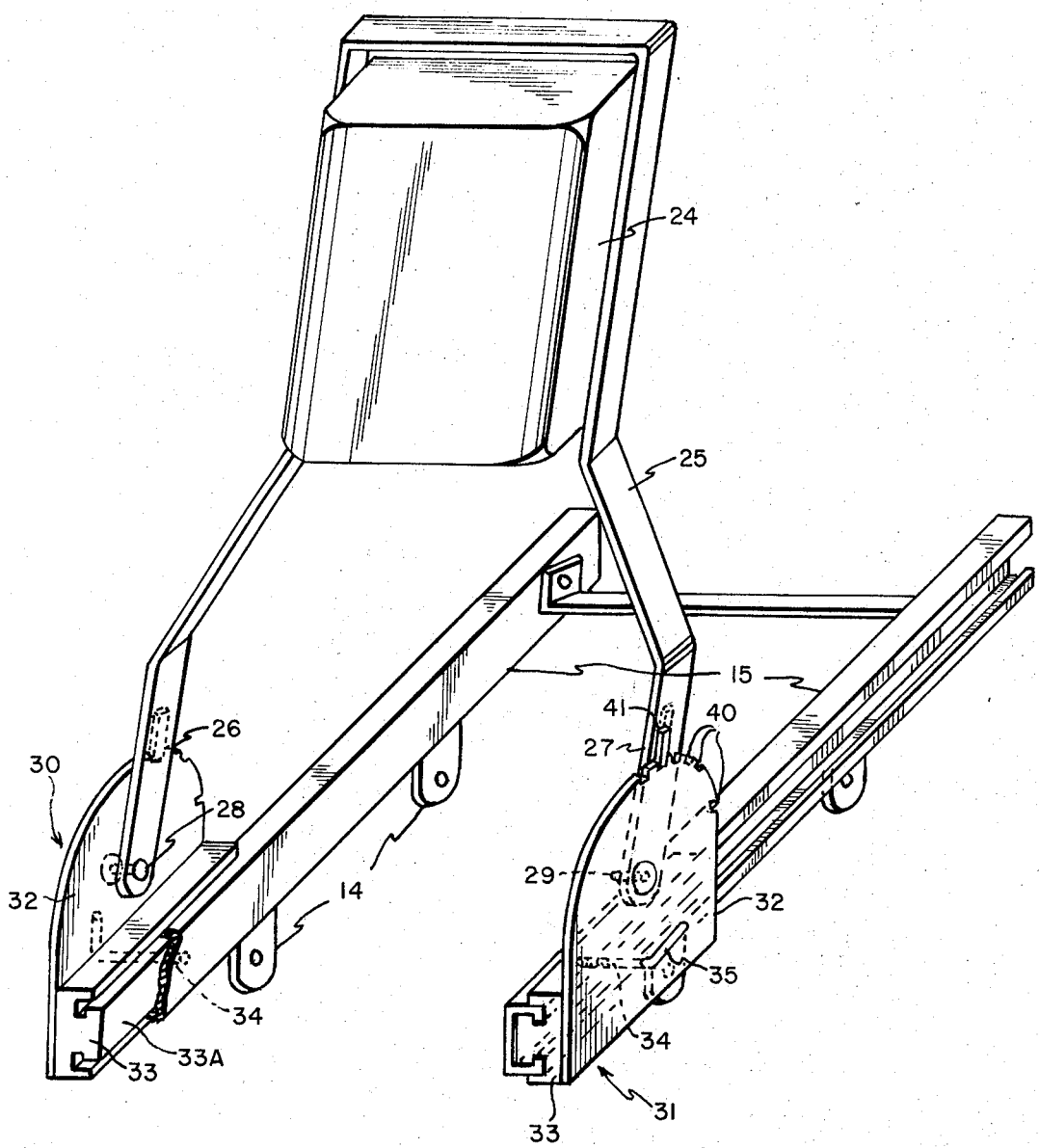

Other features and advantages of the present invention shall be apparent by reference to the accompanying detailed description and the drawings in which FIG. 1 is a partial side elevational view illustrating the mounting of the backrest supporting structure to the frame of the cycle, FIG. 2 is a plan view taken on line 2—2 of FIG. 1, and FIG. 3 is a perspective view of the backrest and its supporting structure.

Referring to FIG. 1 there is illustrated a backrest assembly 10 to be added under and adjacent to the cycle seat 11, by means of supporting rods 12. The spaced brackets 14 are rigidly constructed or welded to the bottom surface of each track 15 of the assembly 10 and provide the means of attaching the assembly 10 on each side of the cycle main frame 16. The cycle main frame 16 is provided with an extended portion 17 from the main top cross bar 18. To reinforce the extension 17 a filler bracket 19 is welded in the joint under 17 and abutting bar 20. The pair of supporting rods 12 extend outward from the extended frame 17 and filler bracket 19 and pass through the spaced brackets 14. The rods 12 may be threaded at the outer end to permit a washer and nut to be used to retain the assembly. It is to be noted that the forward rod 12 also passes through the top of the shock strut 22 for the rear wheel of the cycle.

Referring to FIG. 2 it is apparent that the tracks 15 and their mounting is identical on each side, thus the assembly 10 is retained as shown. Referring to FIG. 3 the tracks 15 are shown as two C-shaped channels positioned in opposed relation with the open portion facing outward. A backrest 24 is mounted in a frame 25 and the two ends 26 and 27 extend downward to be mounted pivotally by pins 28 and 29 in a pair of blocks 30 and 31. Blocks 30 and 31 comprise a face plate 32 and a channelled base portion 33. The base portion is channelled to slidably fit the C-shaped track 15. However the mating fit is loose to allow the block or base portion to slide easily along the track 15. A locking arrangement is provided for each element 30 and 31, this is a threaded stem 34 with a right angle handle 35. The stems are threadably fitted through blocks 30 and 31 with the handle 35 on the outside, the end of the stem 34 should not abut with inner face of the C-shaped tracks. In this position the blocks 30 and 31 are freely movable along the track. To set the blocks 30 and 31 in a chosen fixed position, the stems 34 are rotated by handle 35 clockwise until the end of 34 abuts with the inner face of the C-shaped track 15. This displaces the block assemblies 30 and 31 outward from the C-shaped track to provide a frictional grip thus setting the blocks at that position. It is to be noted that the blocks 30 and 31 may slide the full length of tracks 15. Thus when handle 35 is turned counter-clockwise, there is a loose non-frictionable relationship and blocks 30 and 31 are easily slid or moved along the tracks 15 to a desired position. When a position is chosen, the handle 35, on each side, must be turned clockwise to provide a tight gripping relationship between blocks 30, 31 and the tracks 15 thus the backrest will be set at that particular chosen spot. Referring to the angular adjustment of the backrest 24, the backrest 24 being a cushioned or normal resilient cushion mounted with the frame 25, the two ends 26 and 27 of frame 25 that are pivotally mounted in blocks 30 and 31 require a means of setting and locking in their movement to any of the predetermined positions that may be chosen. To provide a means of so locking the ends 26 and 27, the upper circular periphery of blocks 30 and 31 may be provided with a plurality of slots 40 which are cut into the periphery of the fact plate 32 and a spring pressed pin 41 is mounted on the outer surface of the backrest mounting ends 26 and 27. Pins 41 are cut of the same size and shape to fit slots 40 so that the pins 41 may be pressed downward by the spring for engagement with the slots 40 and of course may be physically lifted upward out of the slots 40 to permit resetting the backrest at a different position with relation to blocks 30 and 31.

It is apparent that with the backrest assembly 10 mounted as described that it may be so mounted on practically any cycle as long as an extension element 17 is added to the cycle frame. Thus the backrest becomes a universal backrest for all bikes or cycles.

This device although shown as an auxiliary attachment to the motorcycle frame may also be manufactured as a complete frame including all features without departing from the spirit of this invention. It is to be noted that a particular type of backrest has been illustrated but any desired height or shape backrest may be similarly mounted in the adjusting device without departing from the spirit of this invention and to conform generally with a particular type of motorcycle seat sometimes referred to as a buddy seat, the backrest as illustrated and its track are of certain proportions. However in view of the many redesigned and one of a kind cycles now in use, this backrest is adaptable to all variations in length or shortening of seats as desired and will be utilized in exactly the same fashion as described herein. Although a particular means of setting the adjusted position of the backrest has been described, other means of setting the forward or backward position of the backrest may be utilized without departing from the spirit of this invention and although a particular means of setting the angular relationship of the backrest is described, other holding means may be provided without departing from the spirit of this invention.

The invention described in detail in the foregoing specification is subject to changes and modifications without departing from the principle and spirit thereof. The terminology used is for purposes of description and not of limitation; the scope of the invention being defined in the claims.

What is claimed is:

1. The combination of a cycle frame having a buddy seat with an adjustable backrest that may be adjusted for posture and may be moved forward or back along the central axis of the motorcycle comprised of a pair of extended frame bars at either side of said seat supporting two parallel tracks in opposed relationship, one on each side of said cycle seat, said parallel tracks slidably supporting a backrest, said backrest comprised of a rigid frame affixed around a cushioned pad and both ends of said frame pivotally affixed to a face plate, each face plate affixed to separate blocks, each block slidably fitted to one of said tracks, each block freely slidable in said track to move said backrest forward or backward without changing the desired posture angle and each block provided with a locking means to lock said block at any position along the length of said tracks and said backrest pivotally adjustable to a desired position.

2. In a device according to claim 1 in which said pivotally mounted backrest is pivotally movable with means to be set at a plurality of angular positions within the movement of the backrest and means to lock said backrest in any of the predetermined positions.

3. In a device according to claim 1 in which said cycle frame is provided with a pair of rearwardly extended horizontal bars having supporting elements for affixing said tracks on either side of said cycle seat.

4. In a device according to claim 1 in which said backrest and supporting tracks are unitary and are mountable on the cycle as a single unit.

* * * * *